US010578444B2

(12) United States Patent
Tanizaki

(10) Patent No.: US 10,578,444 B2
(45) Date of Patent: Mar. 3, 2020

(54) GUIDANCE DEVICE, GUIDANCE METHOD, AND GUIDANCE PROGRAM

(71) Applicant: AISIN AW CO., LTD., Anjo-shi, Aichi-ken (JP)

(72) Inventor: Daisuke Tanizaki, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 184 days.

(21) Appl. No.: 15/543,096

(22) PCT Filed: Feb. 25, 2016

(86) PCT No.: PCT/JP2016/055584
§ 371 (c)(1),
(2) Date: Jul. 12, 2017

(87) PCT Pub. No.: WO2016/140133
PCT Pub. Date: Sep. 9, 2016

(65) Prior Publication Data
US 2017/0336216 A1    Nov. 23, 2017

(30) Foreign Application Priority Data
Mar. 3, 2015  (JP) ................................ 2015-041694

(51) Int. Cl.
*G01C 21/32* (2006.01)
*G06F 16/29* (2019.01)
(Continued)

(52) U.S. Cl.
CPC ......... *G01C 21/32* (2013.01); *G06F 16/2379* (2019.01); *G06F 16/29* (2019.01); *G08G 1/0969* (2013.01); *G09B 29/00* (2013.01)

(58) Field of Classification Search
CPC ..... G01C 21/32; G06F 16/2379; G06F 16/29; G08G 1/0969; G09B 29/00
(Continued)

(56) References Cited

U.S. PATENT DOCUMENTS

2007/0168121 A1*  7/2007  Adachi .................. G01C 21/32
                                                                                    701/532
2008/0249705 A1* 10/2008  Matsuda ................ G01C 21/32
                                                                                    701/532
(Continued)

FOREIGN PATENT DOCUMENTS

CN        101957209 A       1/2011
CN        101988834 A       3/2011
(Continued)

OTHER PUBLICATIONS

Dec. 6, 2017 Supplementary Search Report issued in European Application No. 16758827.6.
(Continued)

*Primary Examiner* — Thomas G Black
*Assistant Examiner* — Wae L Louie
(74) *Attorney, Agent, or Firm* — Oliff PLC

(57) ABSTRACT

Guidance systems, methods, and programs acquire, from a map information providing device, update information for updating map information that is stored in guidance memory, and update, on the basis of the acquired update information, the stored map information. The systems, methods, and programs acquire, from the map information providing device, temporarily delivered information that is used for guidance until the update is complete. The temporarily delivered information has an identical data structure to the stored map information and is replaceable with the stored map information. Until the update is complete, the systems, methods, and programs provide guidance on the basis of the acquired temporarily delivered information. After the update is compete, however, the systems, methods, and programs provide guidance on the basis of the updated map information.

7 Claims, 4 Drawing Sheets

(51) Int. Cl.
*G06F 16/23* (2019.01)
*G09B 29/00* (2006.01)
*G08G 1/0969* (2006.01)

(58) Field of Classification Search
USPC .......................................................... 701/450
See application file for complete search history.

(56) References Cited

U.S. PATENT DOCUMENTS

| | | | |
|---|---|---|---|
| 2010/0274469 A1 | 10/2010 | Takahata et al. | |
| 2011/0282575 A1* | 11/2011 | Masuda | G01C 21/32 |
| | | | 701/533 |
| 2016/0357187 A1* | 12/2016 | Ansari | G01S 15/931 |
| 2017/0176191 A1* | 6/2017 | Li | G01C 21/34 |
| 2017/0336216 A1* | 11/2017 | Tanizaki | G08G 1/0969 |

FOREIGN PATENT DOCUMENTS

| | | |
|---|---|---|
| EP | 2 280 242 A2 | 2/2011 |
| EP | 2 498 057 A1 | 9/2012 |
| JP | 2000-036097 A | 2/2000 |
| JP | 2004-125510 A | 4/2004 |
| JP | 2004-354903 A | 12/2004 |
| JP | 2008-216285 A | 9/2008 |
| JP | 2013-050413 A | 3/2013 |
| JP | 2014-020852 A | 2/2014 |

OTHER PUBLICATIONS

May 17, 2016 International Search Report issued in Patent Application No. PCT/JP2016/055584.

\* cited by examiner

GUIDANCE DEVICE, GUIDANCE METHOD, AND GUIDANCE PROGRAM

TECHNICAL FIELD

Related technical fields include guidance devices, a guidance methods, and a guidance programs.

BACKGROUND

In a conventionally known system as a technique for providing guidance on a travel route, a client side provides guidance on a travel route generated on the basis of map information present on a server side.

Unfortunately, in this system, when the server side and the client side have different versions of map information, due to lack of information for guidance, the client side may be unable to correctly provide guidance on the travel route generated on the server side.

Therefore, as a technique for enabling a client side to correctly provide guidance on a travel route generated on a server side, systems have been proposed which provide guidance by updating map information present on a client side (for example, refer to, Japanese Patent Application Publication No. 2014-20852 (JP 2014-20852 A) and Japanese Patent Application Publication No. 2008-216285 (JP 2008-216285 A)).

SUMMARY

However, in the conventional systems that provide guidance by updating map information present on a client side, as disclosed in, for example, JP 2008-216285 A, when the map information present on the client side is updated by using update information for updating the map information, processing needs to be performed so that updated map information maintains both the consistency of connection between roads (i.e., ensures road network) and the consistency of the arrangement of data in memory that depends on the structure of a database on the client side. Accordingly, it takes a relatively long time to update the map information present on the client side. This prevents the client side from using the map information to provide guidance on a travel route for a relatively long time until an update of the map information is completed, and thus guidance on a travel route may not be quickly provided on the client side.

In view of the above, exemplary embodiments of the broad inventive principles described herein provide a guidance device, a guidance method, and a guidance program that allow guidance to be started quickly.

Exemplary embodiments provide devices, methods, and programs that acquire, from a map information providing device, update information for updating map information that is stored in guidance memory, and update, on the basis of the acquired update information, the stored map information. The devices, methods, and programs acquire, from the map information providing device, temporarily delivered information that is used for guidance until the update is complete. The temporarily delivered information has an identical data structure to the stored map information and is replaceable with the stored map information. Until the update is complete, the devices, methods, and programs provide guidance on the basis of the acquired temporarily delivered information. After the update is compete, however, the devices, methods, and programs provide guidance on the basis of the updated map information.

According to the guidance devices, methods, and programs, guidance is provided on the basis of the temporarily delivered information until the update of the map information is completed, and guidance is provided on the basis of the updated map information after the update of the map information is completed. This, for example, allows guidance to be started quickly by using the temporarily delivered information before the update of the map information is completed, and allows flexible guidance (e.g., guidance with a new search for a travel route) that meets various needs to be provided by using the map information after the update of the map information is completed.

DETAILED DESCRIPTION OF EXEMPLARY EMBODIMENTS

A guidance device, a guidance method, and a guidance program according to an embodiment are described below in detail with reference to the drawings. However, the embodiment is only one example.

The guidance device is a device that provides guidance on the basis of temporarily delivered information until an update of map information is completed, and that provides guidance on the basis of updated map information after the update of map information is completed. The "guidance" refers to guidance provided on the basis of temporarily delivered information or map information, and specifically is a concept that includes guidance on a travel route and guidance on a designated location.

A device that functions as the guidance device includes a vehicle-mounted device or a terminal device is taken as. The "vehicle-mounted device" refers to a device adapted to be mounted on a vehicle and specifically is a concept that includes a navigation device adapted to be mounted on a vehicle. The "terminal device" refers to a device equipped with a predetermined computer and specifically is a concept that includes a smartphone and a mobile navigation device.

The present embodiment describes a case where the "vehicle-mounted device" functions as a guidance device and provides guidance on a travel route. In the description below, a vehicle on which the vehicle-mounted device is mounted (a vehicle in which a user who operates the vehicle-mounted device is) is referred to as a "host vehicle." Although the "host vehicle is a concept that includes, for example, a four-wheeled automobile, a two-wheeled automobile, and a bicycle, the following describes a case where the host vehicle is a four-wheeled automobile.

(Configuration)

Figure 1:
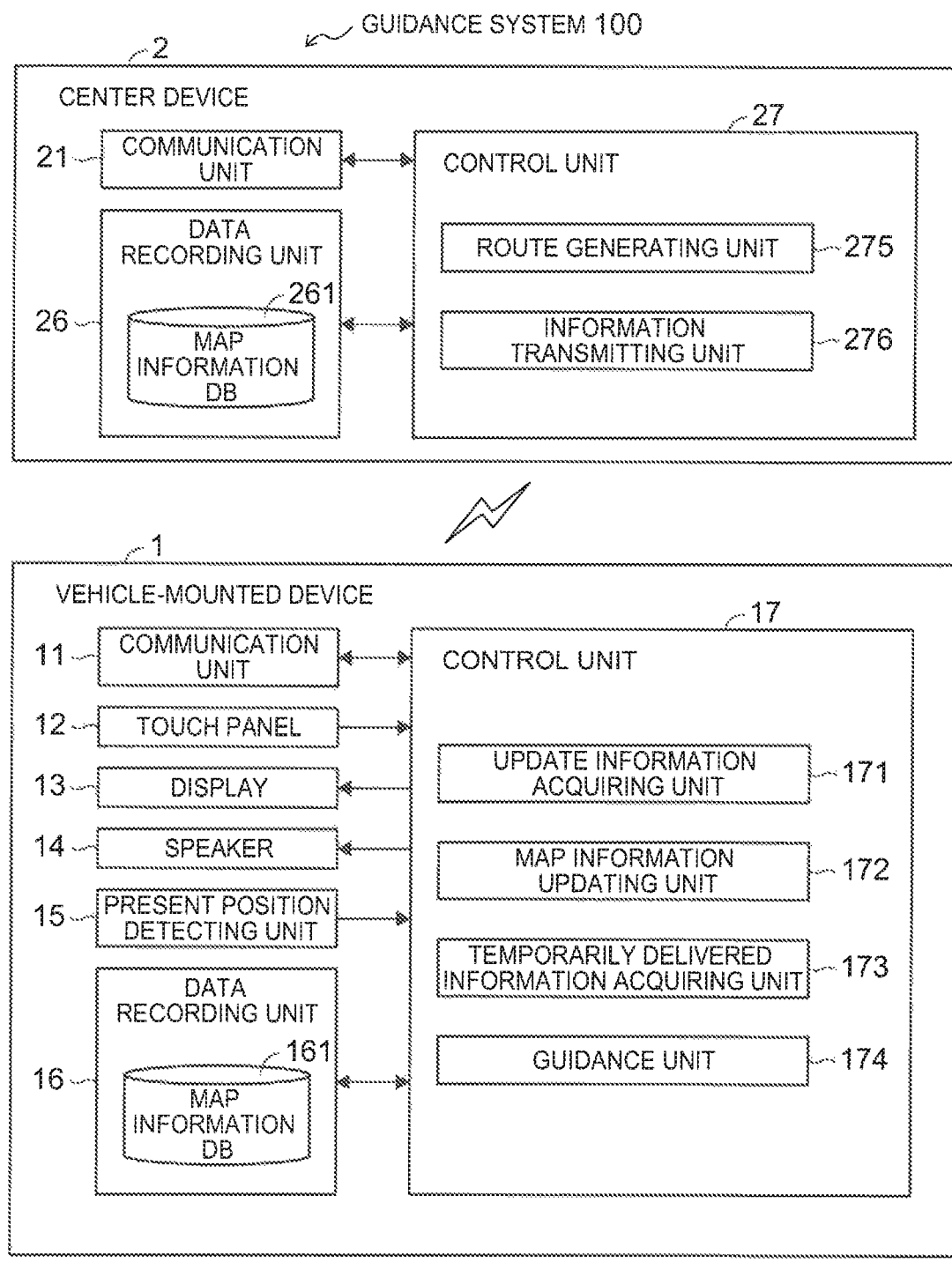
FIG. 1 is a block diagram illustrating a vehicle-mounted device and a center device according to an embodiment.

First, a guidance system 100 according to the present embodiment is described. The guidance system 100 includes a vehicle-mounted device 1 and a center device 2. FIG. 1 is a block diagram illustrating a vehicle-mounted device and a center device according to the embodiment.

(Configuration—Vehicle-Mounted Device)

First, the configuration of the vehicle-mounted device 1 is described. As shown in FIG. 1, the vehicle-mounted device 1 is a guidance device and generally includes a communication unit 11, a touch panel 12, a display 13, a speaker 14, a present position detecting unit 15, a data recording unit 16, and a control unit 17.

(Configuration—Vehicle-Mounted Device—Communication Unit)

The communication unit 11 is communication means for communicating with the center device 2 over a network. The communication unit 11 is not limited to a specific type and configuration, and, for example, known mobile wireless communication means can be used therefor.

(Configuration—Vehicle-Mounted Device—Touch Panel)

The touch panel 12 is operation means for receiving various types of operation inputs from a user by being pressed, for example, with a finger of a user. The touch panel 12 is transparent or semitransparent and is located in front of the display 13 to cover a screen of the display 13. For example, a known touch panel equipped with resistive, capacitive, or other type of operation position detection means can be used as the touch panel 12.

(Configuration—Vehicle-Mounted Device—Display)

The display 13 is display means for displaying various types of images on the basis of control by the later-described control unit 17 and, in particular, is display means for displaying a map on the basis of map information stored in a later-described map information database 161 (hereinafter, database is referred to as "DB"). The display 13 can have any specific configuration, and for example, flat panel displays, such as known liquid crystal displays and organic EL displays, can be used therefor.

(Configuration—Vehicle-Mounted Device—Speaker)

The speaker 14 is sound output means for outputting information by sound on the basis of control by the later-described control unit 17. The sound outputted from the speaker 14 is not limited to a specific mode, and synthetic sound generated as needed or pre-recorded sound can be outputted therefrom.

(Configuration—Vehicle-Mounted Device—Present Position Detecting Unit)

The present position detecting unit 15 is present position detecting means for detecting the present position (the present location) of the vehicle-mounted device 1. The present position detecting unit 15 includes a GPS or a geomagnetic sensor (illustration of each is omitted) and detects the present position (coordinates) and the bearing or the like of the vehicle-mounted device 1 by a known method.

(Configuration—Vehicle-Mounted Device—Data Recording Unit)

The data recording unit 16 is recording means for recording programs and various types of data necessary for operation of the vehicle-mounted device 1, and, for example, a hard disk (illustration is omitted) as an external storage device is used therefor. Note that, any other recording storage medium, including magnetic recording mediums such as magnetic disks or optical recording mediums such as DVDs and Blu-ray Discs, can be used instead of or in addition to a hard disk (the same is true for a later-described data recording unit 26). (As used herein, the term "storage medium" is not intended to encompass transitory signals.)

Furthermore, the data recording unit 16 includes the map information DB 161 and is temporarily delivered information storage means for storing later-described temporarily delivered information acquired by a later-described temporarily delivered information acquiring unit 173.

The map information DB 161 is map information storage means for storing map information. The "map information" refers to information that is used for guidance and that is necessary to identify various locations, including roads, road intersections, road structures, and facilities. The "map information" is any specific data and, for example, includes "data for route search" and "data for guidance, display, and location." Examples of the "data for route search" include: node data associated with nodes set on roads (e.g., node IDs for route search, coordinates for route search, etc.); and link data associated with links set on roads (e.g., link IDs for route search, link names for route search, connection node IDs for route search, road coordinates for route search, road types for route search (e.g., toll roads, local roads, elevated roads, etc.), and the number of lanes for route search). Examples of the "data for guidance, display, and location" include: road data for displaying a map and for locating the present position (e.g., data associated with road shapes such as node data and link data, and data associated with road attributes such as road types, etc.); feature data (e.g., traffic lights, road signs, guardrails, facilities, etc.); and landform data. Such map information in the map information DB 161 is updated in later-described guidance processing.

(Configuration—Vehicle-Mounted Device—Control Unit)

The control unit 17 is control means for controlling the vehicle-mounted device 1 and specifically includes a CPU, various types of programs interpreted and executed by the CPU (including a basic control program, such as an OS, and application programs to be run on an OS to implement specific functions), and an internal memory, such as a RAM, for storing the programs and various types of data. In particular, a guidance program according to the embodiment substantially makes up components of the control unit 17 by being installed in the vehicle-mounted device 1 via any recording medium or via any network (the same is true for a later-described control unit 27).

Furthermore, the control unit 17 functionally and conceptually includes an update information acquiring unit 171, a map information updating unit 172, the temporarily delivered information acquiring unit 173, and a guidance unit 174.

The update information acquiring unit 171 is update information acquiring means for acquiring, from the center device 2, update information for updating map information stored in the map information DB 161. The map information updating unit 172 is map information updating means for updating, on the basis of the update information acquired by the update information acquiring unit 171, the map information stored in the map information DB 161. The temporarily delivered information acquiring unit 173 is temporarily delivered information acquiring means for acquiring, from the center device 2, temporarily delivered information that is used for guidance until the map information updating unit 172 completes the update. The temporarily delivered information has an identical data structure to the map information and is replaceable with the map information. The guidance unit 174 is guidance means for providing guidance on the basis of the temporarily delivered information stored in the data recording unit 16 until the map information updating unit 172 completes the update, and for providing guidance on the basis of the map information updated by the map information updating unit 172 after the map information updating unit 172 completes the update. Processing performed by the components of the control unit 17 will be described later.

The "update information" refers to information for updating the map information stored in the map information DB 161, and specifically corresponds to differential update information or full update information. The "differential update information" refers to information for updating the map information stored in the map information DB 161, and specifically corresponds to a difference between the map information in the map information DB 161 and the map information (for example, of the latest version) in the center device 2. The "full update information" refers to information for updating the map information stored in the map information DB 161, and specifically corresponds to the whole of the map information (for example, of the latest version) in the center device 2. The "updating map information" refers to updating all or at least a piece of data included in the "data for route search" and the "data for guidance, display, and location" in the map information DB 161. As an example, in the description below, the "updating map information" refers to updating "all data." The "temporarily delivered information" refers to information temporarily used for guidance and specifically is information that is used for guidance until the map information updating unit 172 completes the update. The temporarily delivered information has an identical data structure to map information in the map information DB 161 and is replaceable with the map information. The "identical data structure to map information in the map information DB 161" refers to a data structure that can be used for guidance instead of map information in the map information DB 161, and specifically means that the temporarily delivered information includes the same (the same type of) data as at least some data in the map information stored in the map information DB 161. More specifically, the temporarily delivered information includes only the "data for guidance, display, and location" out of the "data for route search" and the "data for guidance, display, and location" (i.e., includes data except the "data for route search") that are contained in the latest version of map information in a later-described map information DB 261 of the center device 2.

(Configuration—Center Device)

Next, the configuration of the center device 2 will be described. As shown in FIG. 1, the center device 2 is a map information providing device, transmits information to the vehicle-mounted device 1, and generally includes a communication unit 21, a data recording unit 26, and a control unit 27.

(Configuration—Center Device—Communication Unit)

The communication unit 21 is communication means for communicating with the vehicle-mounted device 1 over a network and has the same specific structure as the communication unit 11.

(Configuration—Center Device—Data Recording Unit)

The data recording unit 26 includes the map information DB 261.

The map information DB 261 is map information storage means for storing map information. The "map information" stored in the map information DB 261 is information that is used for guidance, that is provider-side map information, and that includes the same information (e.g., the "data for route search" and the "data for guidance, display, and location") as the map information stored in the map information DB 161 of the vehicle-mounted device 1. The map information DB 261 sequentially receives and accumulates the map information that is generated at predetermined time intervals (e.g., every day, every week, etc.) on the basis of the latest information on a map (e.g., information on removal or addition of roads). Thus, the map information DB 261 stores previous versions of the map information in addition to the latest version of the map information.

(Configuration—Center Device—Control Unit)

The control unit 27 functionally and conceptually includes a route generating unit 275 and an information transmitting unit 276. The route generating unit 275 is route generating means for generating a travel route, by a known search method, on the basis of the map information in the map information DB 261. The information transmitting unit 276 is information transmitting means for transmitting information. Processing performed by the components of the control unit 27 will be described later.

(Processing)

Figure 2:
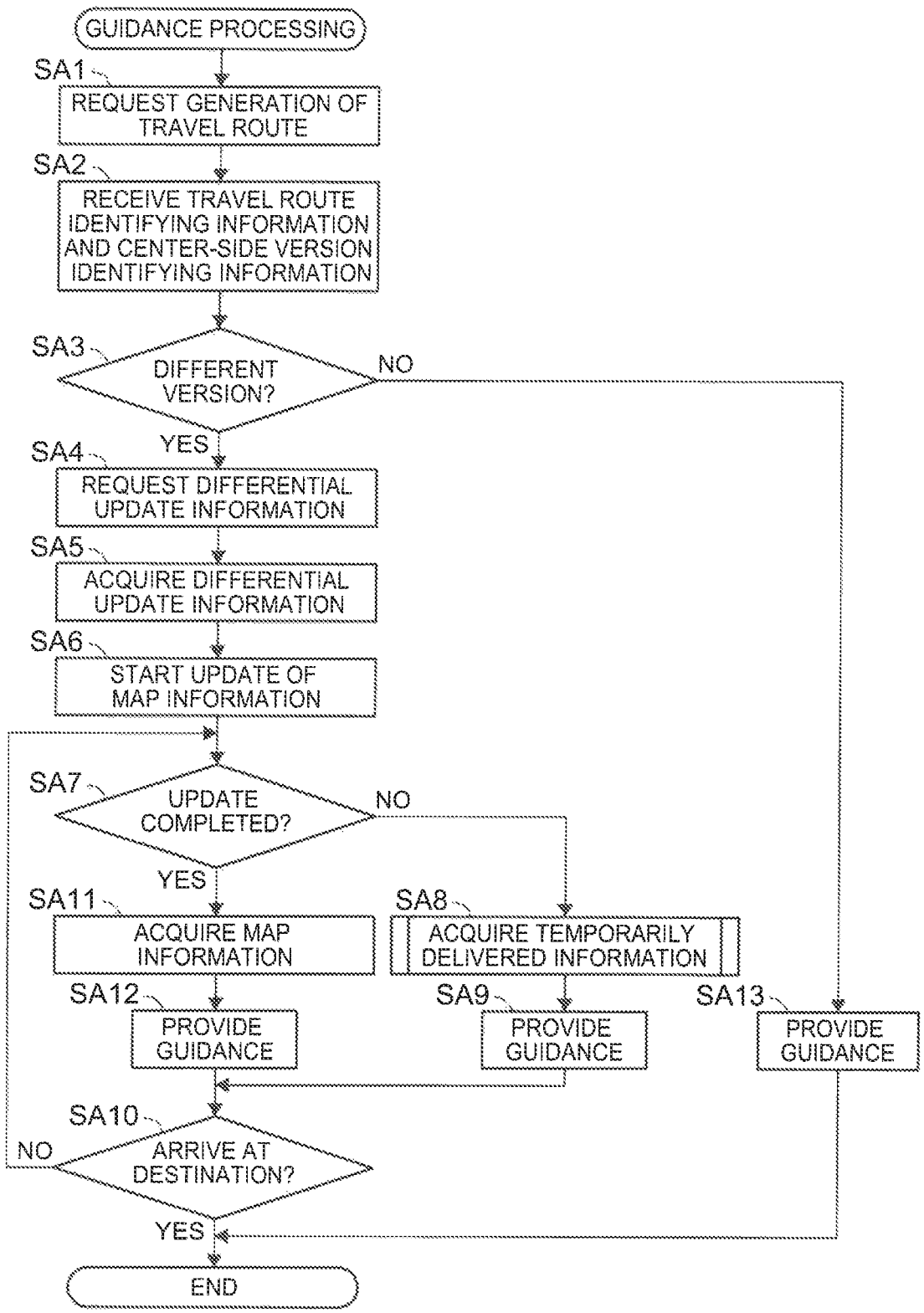
FIG. 2 is a flowchart of guidance processing.

Next, guidance processing performed by the vehicle-mounted device 1 of the guidance system 100 is described. FIG. 2 is a flowchart of the guidance processing (step is abbreviated as "S" in the description below for processing). In general, the guidance processing requests the center device 2 to generate a travel route and provides guidance on the basis of the travel route that the center device 2 generates in response to the request, by using temporarily delivered information and map information updated by a so-called Map On Demand (MOD) as needed. The "Map On Demand" is a concept that includes processing for updating map information on the basis of update information transmitted from the center device 2. The guidance processing is executed at any timing. Here it is assumed, for example, that the guidance processing is activated when the vehicle-mounted device 1 is powered on, and the description starts from when the guidance processing is activated. The following describes the guidance processing for the case where the "update information" is the "differential update information."

First, as shown in FIG. 2, in SA1, the guidance unit 174 of the vehicle-mounted device 1 requests the center device 2 to generate a travel route on which the vehicle-mounted device 1 provides guidance. Specifically, in order to request the generation of a travel route from a departure point to a destination, the guidance unit 174 transmits, to the center device 2 via the communication unit 11, a travel route generating request that contains the departure point, the destination, and identification information (hereinafter, device ID) for uniquely identifying the vehicle-mounted device 1. The "travel route" refers to a route that should be traveled. The "departure point" refers to a point from which a vehicle starts traveling. For example, the "departure point" is set upon receipt of a predetermined operation performed by a user via the touch panel 12 or is set to the present position detected by the present position detecting unit 15. The "destination" refers to a point to which a vehicle intends to travel and is set, for example, upon receipt of a predetermined operation performed by a user via the touch panel 12.

On the other hand, the center device 2 that receives the travel route generating request transmitted in SA1 generates a travel route corresponding to the received travel route generating request and transmits information that identifies the generated travel route. Specifically, the route generating unit 275 of the center device 2 generates a travel route from the departure point contained in the travel route generating request to the destination contained in the travel route generating request on the basis of the latest version of the map information in the map information DB 261. Next, the information transmitting unit 276 of the center device 2 transmits, via the communication unit 21, travel route identifying information (here, for example, link IDs on the travel route) and center-side version identifying information to the vehicle-mounted device 1 corresponding to the device ID contained in the travel route generating request. The travel route identifying information is information for identifying the travel route itself generated by the route generating unit 275. The center-side version identifying information is information for identifying the version of the map information used to generate the travel route.

Subsequently, in SA2, the control unit 17 of the vehicle-mounted device 1 receives, via the communication unit 11, the travel route identifying information and the center-side version identifying information transmitted by the center device 2.

Next, in SA3, the update information acquiring unit 171 of the vehicle-mounted device 1 determines whether the version of the map information used to generate the travel route (i.e., the latest version of the map information in the map information DB 261) differs from the version of the map information in the map information DB 161. Specifically, the update information acquiring unit 171 determines whether the version identified by the center-side version identifying information received in SA2 differs from the version of the map information in the map information DB 161. If the update information acquiring unit 171 determines that the versions differ from each other (YES in SA3), an update of the map information is determined to be necessary, so that the guidance processing proceeds to SA4. If the update information acquiring unit 171 determines that the versions do not differ from each other (i.e., if the update information acquiring unit 171 determines that the versions are the same as each other) (NO in SA3), the update of the map information is determined to be unnecessary, so that the guidance processing proceeds to SA13.

Next, in SA4, the update information acquiring unit 171 of the vehicle-mounted device 1 requests the transmission of differential update information. Specifically, the update information acquiring unit 171 identifies an update area on a map and transmits, via the communication unit 11 to the center device 2, a differential update information transmission request that contains the identified update area, the version of the map information in the map information DB 161, and the device ID of the vehicle-mounted device 1.

The "update area" refers to an area to be updated in map information. Any method that identifies an area corresponding to a travel route can be used as a method of "identifying the update area," and, for example, a method described below can be used. Specifically, this method identifies, in the map information in the map information DB 161, the location of a road (e.g., road coordinates, etc.) on the travel route corresponding to the link IDs contained in the travel route identifying information received in SA2, and identifies a certain area along the identified road (hereinafter, road identified at the vehicle-mounted device 1 side) as the update area. Specifically, "identifying a certain area along the road identified at the vehicle-mounted device 1 side as the update area" refers to identifying, as the update area, a certain area corresponding to meshes that include all regions within a predetermined distance (e.g., 20 kilometers) from each point on the road identified at the vehicle-mounted device 1 side (hereinafter, this method is referred to as a "method that uses a mesh as a reference unit" as necessary). The "mesh" refers to a reference unit for map information and also refers to a predetermined reference area. Specifically, the "mesh" corresponds to an area of a square with sides of several kilometers (e.g., 10 kilometers) on a map.

When the road identified at the vehicle-mounted device 1 side is discontinuous in a section between the departure point and the destination because the location of the road on the travel route corresponding to some of the link IDs contained in the travel route identifying information cannot be identified in the map information in the map information DB 161, on the basis of the difference in version of the map information, the following first to third methods may be used to identify the update area corresponding to the discontinuous section.

The first method is specifically a method that uses a reference line for the discontinuous section. The "reference line" refers to a line corresponding to a road that is treated, in the discontinuous section, as the "road identified at the vehicle-mounted device 1 side." Specifically, the "reference line" is a line drawn, for example, by using a known complementary technique (e.g., linear complement of the road identified at the vehicle-mounted device 1 side). More specifically, in this method, the reference line is drawn in the discontinuous section, and the update area corresponding to the discontinuous section is identified, by treating the drawn reference line as "the road identified at the vehicle-mounted device 1 side" in the discontinuous section, on the basis of the method that uses a mesh as a reference unit.

The second method specifically identifies, as the update area corresponding to the discontinuous section, a single area that includes two separate points that are located on the "road identified at the vehicle-mounted device 1 side" across the discontinuous section (i.e., two points that define the ends of the discontinuous section). The single area can have any shape that covers an area large enough to include any road corresponding to the link ID of the road whose location cannot be identified. For example, the single area may have a circular shape or an ellipse shape.

The third method is specifically a method that generates a road for the discontinuous section at the vehicle-mounted device 1 side. This method is used by focusing on the fact that the possibility of a road corresponding to the link ID in the discontinuous section is unlikely to be located far away from a road generated in the discontinuous section by the search of the vehicle-mounted device 1 side (i.e., the fact that a new road is likely to be built in the vicinity of an existing road). More specifically, in this method, the vehicle-mounted device 1 generates, by a known method, a travel route from a departure side point to a destination side point that are the two separate points located on the "road identified at the vehicle-mounted device 1 side" across the discontinuous section, and then the update area corresponding to the discontinuous section is identified, by treating the generated travel route as the "road identified at the vehicle-mounted device 1 side" in the discontinuous section, on the basis of the method that uses a mesh as a reference unit.

On the other hand, the center device 2 that receives the differential update information transmission request transmitted in SA4 generates differential update information corresponding to the received differential update information transmission request and transmits the generated differential update information. Specifically, the information transmitting unit 276 of the center device 2 first generates differential update information corresponding to the update area and the version of the map information that are contained in the differential update information transmission request. The detail of the generation of the differential update information is that the differential update information for the update area contained in the differential update information transmission request is generated to correspond to a difference between the version of the map information contained in the differential update information transmission request and the latest version of the map information in the map information DB 261. The information transmitting unit 276 then transmits, via the communication unit 21, the generated differential update information to the vehicle-mounted device 1 corresponding to the device ID contained in the differential update information transmission request.

Next, in SA5, the update information acquiring unit 171 of the vehicle-mounted device 1 receives and acquires the differential update information via the communication unit 11.

Next, in SA6, the map information updating unit 172 of the vehicle-mounted device 1 starts an update of the map information in the map information DB 161. Specifically, the map information updating unit 172 starts the update of the map information in order to reflect the differential update information acquired in SA5.

Next, in SA7, the guidance unit 174 of the vehicle-mounted device 1 determines whether the update of the map information started in SA6 is completed. Any method can be used for this determination, and a method described below may be used. Specifically, a complete flag is set when the update is completed, and the guidance unit 174 makes the determination on the basis of whether the complete flag is set. If the complete flag is set, the guidance unit 174 determines that the update is completed (YES in SA7), and the guidance processing proceeds to SA11. If no complete flag is set, the guidance unit 174 determines that the update is still uncompleted (NO in SA7), and the guidance processing proceeds to SA8.

Figure 3:
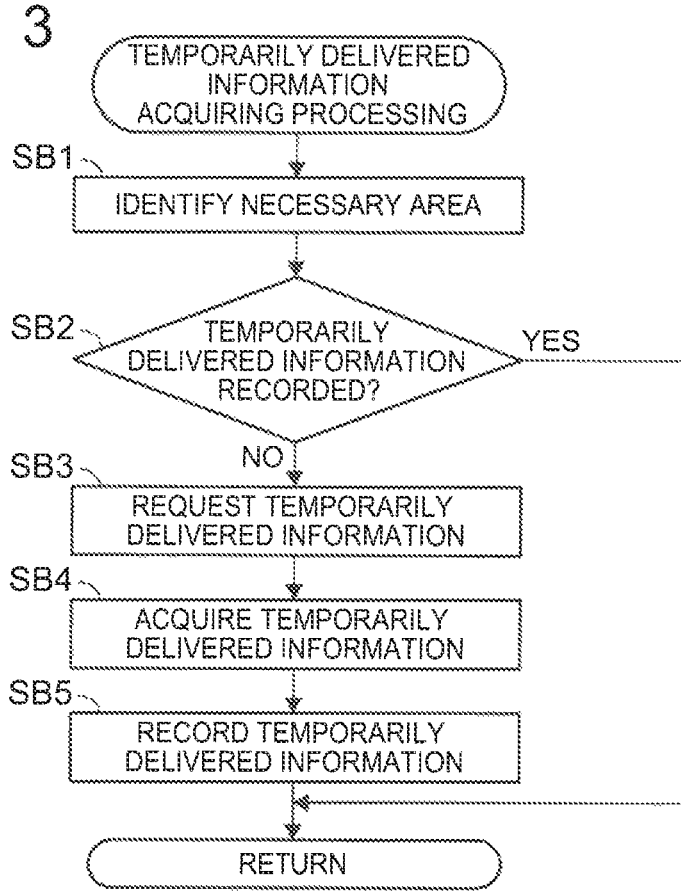
FIG. 3 is a flowchart of temporarily delivered information acquiring processing.
Figure 4:
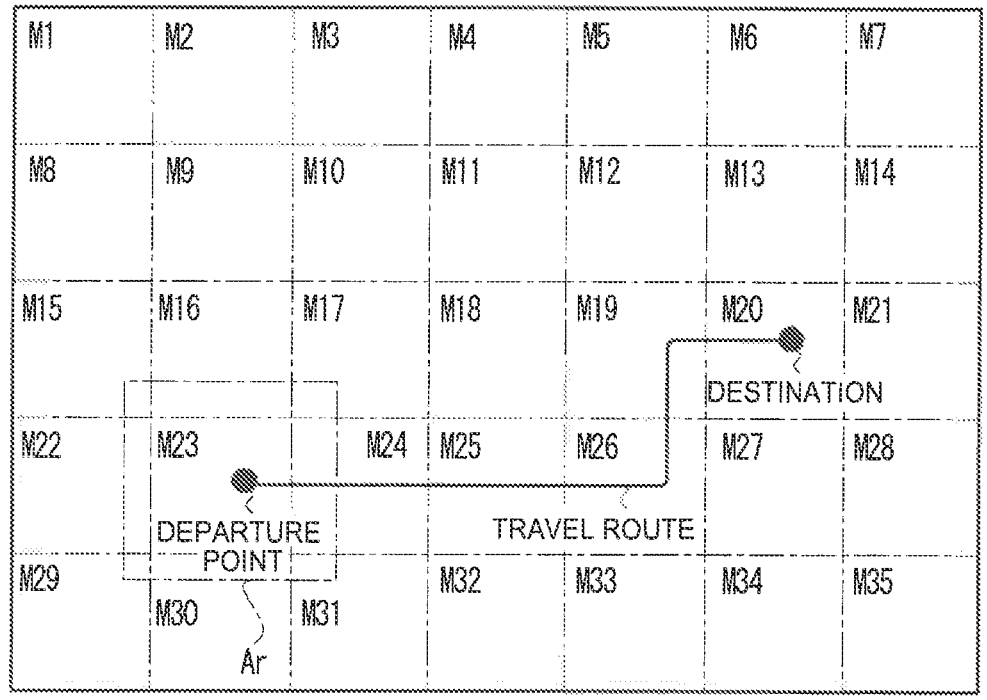
FIG. 4 is a diagram illustrating an example of a travel route and meshes.

Subsequently, in SA8, the temporarily delivered information acquiring unit 173 of the vehicle-mounted device 1 activates temporarily delivered information acquiring processing. FIG. 3 is a flowchart of the temporarily delivered information acquiring processing. First, as shown in FIG. 3, in SB1, the temporarily delivered information acquiring unit 173 of the vehicle-mounted device 1 identifies a necessary area. The "necessary area" refers to an area of temporarily delivered information necessary to provide guidance on the travel route at the present time, and specifically refers to an area corresponding to an area on a map that uses a mesh as a reference unit. As already described, the "mesh" is a reference unit for the map information and can have the same dimensions as or different dimensions from the mesh used in SA4 in FIG. 2. Any method that identifies an area within a predetermined distance from the present position can be used as a method of "identifying the necessary area," and, for example, a method described below may be used. This method specifically identifies, as the necessary area, meshes including an area of a square that has sides of a predetermined distance (e.g., 15 kilometers) and that has the center at the present position detected by the present position detecting unit 15. FIG. 4 is a diagram illustrating an example of a travel route and meshes. Meshes M1 to M35 in FIG. 4 correspond to meshes on a map that includes the travel road identified by the travel route identifying information acquired in SA2 in FIG. 2. The description below is based on the assumption that the "travel route" in FIG. 4 corresponds to the travel route identified by the travel route identifying information acquired in SA2 in FIG. 2. Here, in FIG. 4, for example, when the present position detected by the present position detecting unit 15 is the "departure point," and the area of the square that has sides of the predetermined distance and that has the center at the present position is an area Ar, the meshes M15 to M17, M22 to M24, and M29 to M31 (hereinafter, necessary area mesh) out of the meshes M1 to M35 are identified as the necessary area.

Referring back to FIG. 3, in SB2, the temporarily delivered information acquiring unit 173 of the vehicle-mounted device 1 determines whether all of the temporarily delivered information on the necessary area identified in SB1 are recorded in the data recording unit 16. If the temporarily delivered information acquiring unit 173 determines that all of the temporarily delivered information on the necessary area identified in SB1 is recorded in the data recording unit 16 (YES in SB2), the guidance processing proceeds to SA9 in FIG. 2 by returning the temporarily delivered information acquiring processing. If the temporarily delivered information acquiring unit 173 does not determine that all of the temporarily delivered information on the necessary area identified in SB1 are recorded in the data recording unit 16 (i.e., if the temporarily delivered information acquiring unit 173 determines that any of the temporarily delivered information on the necessary areas identified in SB is not recorded in the data recording unit 16) (NO in SB2), the temporarily delivered information acquiring processing proceeds to SB3. Here, in FIG. 4, for example, the temporarily delivered information acquiring unit 173 determines whether all of the temporarily delivered information on the "necessary area mesh" out of the meshes M1 to M35 is recorded in the data recording unit 16.

Referring back to FIG. 3, in SB3, the temporarily delivered information acquiring unit 173 of the vehicle-mounted device 1 requests temporarily delivered information. Specifically, the temporarily delivered information acquiring unit 173 transmits, via the communication unit 11 to the center device 2, temporarily delivered information transmission request that contains a transmission area and the device ID of the vehicle-mounted device 1. The "transmission area" refers to an area on which the temporarily delivered information is requested to be transmitted and also refers to an area on a map that uses a mesh as a reference unit. Specifically, the "transmission area" refers to mesh identification information (hereinafter, mesh ID) of a mesh on which the temporarily delivered information is not recorded in the data recording unit 16, out of the "necessary area mesh" identified in SB1. Here, in FIG. 4, for example, when none of the "necessary area mesh" is recorded, the transmission area is all of the mesh IDs of the "necessary area mesh."

On the other hand, the center device 2 that receives the temporarily delivered information transmission request transmitted in SB3 acquires temporarily delivered information corresponding to the received temporarily delivered information transmission request and transmits the acquired temporarily delivered information. Specifically, the information transmitting unit 276 of the center device 2 acquires, as the temporarily delivered information, data that is included in the "data for guidance, display, and location" of the latest version of the map information in the map information DB 261 and that corresponds to the transmission area contained in the temporarily delivered information transmission request. The information transmitting unit 276 then transmits, via the communication unit 21, the acquired temporarily delivered information to the vehicle-mounted device 1 corresponding to the device ID contained in the temporarily delivered information transmission request. Any method can be used as a method of acquiring the temporarily delivered information. For example, the center device 2 may generate temporarily delivered information corresponding to the transmission area contained in the received temporarily delivered information transmission request (i.e., "data for guidance, display, and location" of the latest version of the map information in the map information DB 261) and may acquire the generated temporarily delivered information. In another example of the method of acquiring the temporarily delivered information, a mesh ID and temporarily delivered information corresponding to the mesh ID (i.e., "data for guidance, display, and location" of the latest version of the map information in the map information DB 261) that are input from other devices via the communication unit 21 and stored in the data recording unit 26 may be acquired from the data recording unit 26. This configuration removes the need to generate the temporarily delivered information every time the temporarily delivered information transmission request is received, thus preventing load on the center device 2 side from increasing by the generation.

Next, in SB4, the temporarily delivered information acquiring unit 173 of the vehicle-mounted device 1 receives and acquires the temporarily delivered information via the communication unit 11.

Next, in SB5, the temporarily delivered information acquiring unit 173 of the vehicle-mounted device 1 records (stores), in the data recording unit 16, the temporarily delivered information acquired in SB4. The guidance processing then proceeds to SA9 in FIG. 2 by returning the temporarily delivered information acquiring processing.

Referring back to FIG. 2, in SA9, the guidance unit 174 of the vehicle-mounted device 1 generates data about the travel route and facilities and/or the like along the travel route (i.e., guidance data based on "data for guidance, display, and location") on the basis of the travel route identifying information received in SA2 and the temporarily delivered information recorded in the data recording unit 16, and provides guidance by displaying the generated data about the travel route and facilities and/or the like along the travel route on the display 13 and by outputting the generated data from the speaker 14. In this case, although the update of the map information is uncompleted, guidance can be provided on the basis of information (i.e., the temporarily delivered information) corresponding to the map information used to generate the travel route identified by the travel route identifying information received in SA2. Thus, it is possible to start providing guidance on the travel route quickly.

Next, in SA10, the guidance unit 174 of the vehicle-mounted device 1 determines whether the host vehicle arrives at the destination. Specifically, the guidance unit 174 determines whether the present position detected by the present position detecting unit 15 corresponds to the destination. If the guidance unit 174 determines that the host vehicle arrives at the destination (YES in SA10), the guidance processing ends. If the guidance unit 174 determines that the host vehicle has not arrived at the destination yet (NO in SA10), the guidance processing proceeds to SA7.

If the guidance unit 174 determines, in SA7, that the update is completed (YES in SA7), the control unit 17 of the vehicle-mounted device 1 acquires, in SA11, the map information in the map information DB 161.

Next, in SA12, the guidance unit 174 of the vehicle-mounted device 1 provides guidance in the same manner as in SA9 on the basis of both the travel route identifying information received in SA2 and the map information acquired in SA11. As described above, guidance can be provided on the basis of the map information in the map information DB 161, namely, information including the latest version of the "data for route search." Thus, for example, when the host vehicle deviates from the travel route generated by the request made in SA1, the travel route can be searched again (i.e., generated again) on the basis of the latest version of the "data for route search."

It is noted that in SA3, if the update information acquiring unit 171 determines that the versions do not differ from each other (i.e., if the update information acquiring unit 171 determines that the versions are the same as each other) (NO in SA3), the guidance processing proceeds to SA13 where the guidance unit 174 of the vehicle-mounted device 1 continues providing guidance without updating the map information until the host vehicle arrives at the destination. Specifically, the travel route is generated on the basis of both the travel route identifying information received in SA2 and the map information stored in the map information DB 161, and guidance is provided by displaying the generated travel route on the display 13 and by outputting the generated travel route from the speaker 14.

(Effects of the Embodiment)

As describe above, according to the present embodiment, until the update of the map information in the map information DB 161 is completed, guidance is provided on the basis of the temporarily delivered information, and after the update of the map information in the map information DB 161 is completed, guidance is provided on the basis of the updated map information. Thus, for example, before the update of the map information is completed, guidance can be started quickly by using the temporarily delivered information. In addition, after the update of the map information is completed, flexible guidance that meets various needs (e.g., guidance with a new search for the travel route) can be provided by using the map information.

Furthermore, the update information acquiring unit 171 acquires the differential update information on an area corresponding to the travel route. This, for example, prevents the map information from being updated unnecessarily on the basis of the differential update information unrelated to the travel route, thus reducing the time taken to update the map information and reducing the amount of communication between the vehicle-mounted device 1 and the center device 2.

Moreover, the temporarily delivered information acquiring unit 173 acquires the temporarily delivered information that is used for guidance inside an area within a predetermined distance from the present position. This, for example, prevents the vehicle-mounted device 1 from unnecessarily communicating with the center device 2 to acquire the temporarily delivered information unrelated to guidance, thus reducing the amount of communication between the vehicle-mounted device 1 and the center device 2.

(Modifications of the Embodiment)

While the embodiment has been described, any changes and improvements may be made to the specific configuration without departing from the technical spirit. Such modifications will be described below.

(Problems to be Solved and Effects)

Problems to be solved and effects are not limited to those described above and may vary depending on the environment where a particular embodiment is implemented and/or details of the configuration. Therefore, only part of the problem described above may be solved, and/or only part of the effects described above may be achieved. For example, when the guidance device is capable of starting guidance as quickly as conventional ones by structure different from that of conventional ones, a problem is being solved.

(Division and Integration)

The electronic components described above are merely functional concepts and are not always required to have such physical configuration as illustrated in the drawings. That is, the specific form of division/integration of each component is not limited to that shown in the drawings. The components, as a whole or in part, can be divided and/or integrated in any manner either functionally or physically depending on various types of loads and use conditions. For example, the vehicle-mounted device 1 may be divided in multiple devices (including a center device and a terminal device) that are configured to be capable of communicating with each other. In this case, a part of the update information acquiring unit 171, the map information updating unit 172, or the temporarily delivered information acquiring unit 173 may be provided in a part of the multiple devices, and another part of the update information acquiring unit 171, the map information updating unit 172, or the temporarily delivered information acquiring unit 173 may be provided in another part of the multiple devices.

(Shape, Number, Structure, and Time Sequence)

For the components illustrated in the embodiment and the drawings, any changes and improvements may be made to their shape, the number of them, or their relationship in structure or time sequence without departing from the technical spirit.

(Identification of Necessary Area)

According to the embodiment, the meshes identified as the necessary area in SB1 in FIG. 3 include an area of a square that has sides of a predetermined distance (e.g., 15 kilometers) and that has the center at the present position. However, the identification is not limited to this. For example, the meshes identified as the necessary area may have an area of a predetermined shape (e.g., a circular shape, an elliptical shape, a polygonal shape, etc.) that includes the present position. As another example, a single mesh that includes the present position may be identified as the necessary area. As another example, a single mesh that includes the present position and a mesh adjacent to the single mesh may be identified and the identified meshes may be identified as the necessary area. In this case, the adjacent mesh may be identified by identifying the position of a road on the travel route in the same manner as in SA4 in FIG. 2 and by identifying one mesh on the identified road as the adjacent mesh. Alternatively, all of the meshes that are located adjacent to and around a single mesh that includes the present position may be identified as the adjacent mesh. As another example, meshes identified as the necessary area may be located on the travel route and arranged in series from the present position to a predetermined point on the travel route. The "predetermined point" refers to a point that is located closer to the destination (i.e., traveling direction side) than the present position on the travel route. Specifically, the "predetermined point" may be a point located at a predetermined distance (e.g., 30 kilometers) from the present position or may be a point located midway between the present position and the destination.

(Identification of Update Area)

According to the embodiment, the vehicle-mounted device 1 identifies the update area in SA4 in FIG. 2. However, the identification is not limited to this. For example, the center device 2 may identify the update area. In this case, specifically, the vehicle-mounted device 1 may transmit, in SA4, the travel route identifying information acquired in SA2 to the center device 2, and the center device 2 may identify the update area by the same method as those described in the embodiment. In this case, the update area can be identified by using the map information (i.e., the map information in the map information DB 261) used to generate the travel route identified by the travel route identifying information, thus causing no "discontinuous section" described in the embodiment. Accordingly, the update area can be identified easily.

(Deletion and Retention of Temporarily Delivered Information)

Out of the temporarily delivered information recorded in SB5 in FIG. 3 in the embodiment, unnecessary information for guidance may be deleted, and then the temporarily delivered information may be temporarily recorded (stored) in the data recording unit 16. The "unnecessary information for guidance" refers to information that has been previously used to provide guidance on the travel route and is no longer necessary at the present time, and specifically refers to information on an area outside the necessary area identified in SB1. This deletion of the unnecessary information prevents the data capacity of the data recording unit 16 from being occupied by the unnecessary information. If the data recording unit 16 shown in FIG. 1 has enough data capacity, the temporarily delivered information recorded in SB5 in FIG. 3 in the embodiment may be retained for a predetermined period of time (e.g., one to three months) without being deleted.

(Recording of Temporarily Delivered Information)

According to the embodiment, in SB5 in FIG. 3, the temporarily delivered information is recorded in the data recording unit 16 shown in FIG. 1. However, the recording is not limited to this. For example, a cache may be provided in addition to the data recording unit 16, and the temporarily delivered information may be recorded in the cache.

(Procedures in Guidance Processing)

According to the embodiment, the guidance processing shown in FIG. 2 includes SA1 to SA3 and SA13. However, the guidance processing is not limited to this. For example, SA1 to SA3 and SA13 may be omitted. In this case, after a user recognizes, through a predetermined means, the need to update the map information in the map information DB 161 of the vehicle-mounted device 1, the guidance processing may be activated upon receipt of a predetermined operation performed by the user through the touch panel 12, so that the procedures of SA4 to SA12 can be executed.

(Guidance)

According to the embodiment, a guidance target on which guidance is provided is the travel route generated by the center device 2. However, the guidance target is not limited to this. For example, a designated location may be the guidance target on which guidance is provided. The "designated location" refers to a point on a map, and specifically refers to a point that is set upon receipt of a predetermined operation performed by a user via the touch panel 12. In this case, the guidance processing proceeds so that guidance on the designated location can be provided on the basis of the latest version of the map information or the temporarily delivered information. Specifically, a mesh (e.g., the mesh M10 in FIG. 14) that includes the designated location undergoes the procedures of SA3 to SA13.

According to the embodiment, the differential update information is requested in S4 of the guidance processing shown in FIG. 2. However, the guidance processing is not limited to this. For example, the center device 2 may be configured to monitor the status of the vehicle-mounted device 1 and to determine whether the update of the map information in the vehicle-mounted device 1 is necessary. If the center device 2 determines that the update of the map information is necessary independent of the request made in SA4, the differential update information may be transmitted, and the transmitted differential update information may be acquired in SA5. For the temporarily delivered information, the procedures of SA3 and SB4 in FIG. 3 may be executed in the same manner as those in this modification.

(Guidance Processing)

Figure 5:
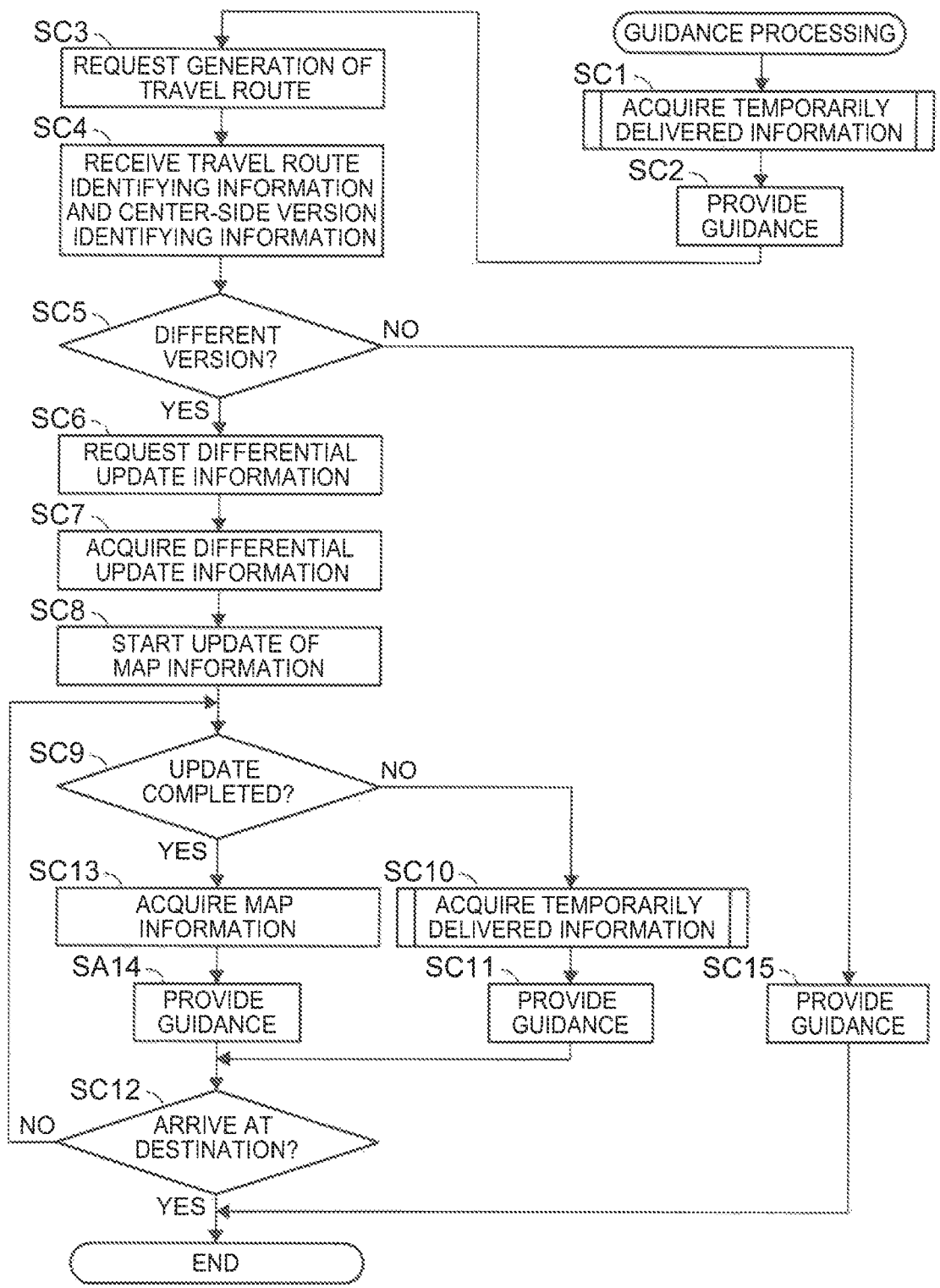
FIG. 5 is a flowchart of guidance processing according to a modification.

In the embodiment, SA8 and SA9 in FIG. 2 may be executed before the generation of the travel route is requested in SA1, and the procedures of SA3 and SA4 in FIG. 2 may be executed on the basis of meshes. FIG. 5 is a flowchart of guidance processing according to a modification. The guidance processing shown in FIG. 5 is the same as the guidance processing shown in FIG. 2 except some procedures. The same procedures as those in the guidance processing shown in FIG. 2 are indicated as such, and procedures different from those in the guidance processing shown in FIG. 2 will be described in detail. The guidance processing is executed at any timing. For example, it is assumed here that the "departure point" and the "destination" which are described for SA1 in FIG. 2 are set upon receipt of a predetermined operation performed by a user via the touch panel 12 after the vehicle-mounted device 1 is powered on, and that the guidance processing is activated when the "departure point" and the "destination" are set. The description will start from when the guidance processing is activated.

First, as shown in FIG. 5, in SC1, the temporarily delivered information acquiring unit 173 of the vehicle-mounted device 1 executes a temporarily delivered information acquiring processing. Specifically, like in SA8 in FIG. 2, the procedures of SB1 to SB5 in FIG. 3 are executed, and for example, the temporarily delivered information on the "necessary area mesh" is recorded in the data recording unit 16.

Referring back to FIG. 5, in SC2, the guidance unit 174 of the vehicle-mounted device 1 generates data (i.e., display and guidance data based on "data for guidance, display, and location") about a road map, facilities, and/or the like in an area in the vicinity of the host vehicle (i.e., an area corresponding to an area of the temporarily delivered information recorded in the data recording unit 16) on the basis of the temporarily delivered information recorded in the data recording unit 16, and provides guidance by displaying the data about the facilities and/or the like on the display 13 and by outputting the data from the speaker 14. Executing SC1 and SC2 before later-described SC3 in this way enables guidance to be provided quickly.

Next, in SC3, the guidance unit 174 of the vehicle-mounted device 1 requests the center device 2 to generate the travel route on which the vehicle-mounted device 1 provides guidance. Specifically, like in SA1 in FIG. 2, the guidance unit 174 transmits, via the communication unit 11 to the center device 2, the travel route generating request containing the device ID, the departure point and the destination that have been set upon activation of the guidance processing. On the other hand, the center device 2 that receives the travel route generating request transmitted in SC3 in FIG. 5 executes the same procedures as the center device 2 executes when receiving the travel route generating request transmitted in SA1 in FIG. 2, thereby transmitting the travel route identifying information and the center-side version identifying information that identifies the version of each mesh in the map information used to generate the travel route.

Referring back to FIG. 5, in SC4, like in SA2 in FIG. 2, the travel route identifying information and the center-side version identifying information are received via the communication unit 11.

Referring back to FIG. 5, the control unit 17 of the vehicle-mounted device 1 identifies the position of a road on the travel route by a method described for SA4 in FIG. 2 and then determines whether the version of each of the meshes in the map information in the map information DB 161 differs from the version of a corresponding mesh in the map information used to generate the travel route (i.e., the latest version of a corresponding mesh in the map information in the map information DB 261). Specifically, the control unit 17 identifies, on a mesh basis, the version of the map information used to generate the travel route by referring the information received in SC4. The control unit 17 then compares, on a mesh basis, the version of the map information in the map information DB 161 with the version of the map information used to generate the travel route (i.e., the latest version of the map information in the map information DB 261), and makes a determination on the basis of the comparison result. If the control unit 17 determines, as a result of the comparison, that the version of at least one of the meshes in the map information in the map information DB 161 differs from the version of the corresponding mesh in the map information used to generate the travel route (i.e., the latest version of the corresponding mesh in the map information in the map information DB 261) (YES in SC5), the guidance processing proceeds to SC6. If the control unit 17 determines, as a result of the comparison, that the version of each of the meshes in the map information in the map information DB 161 is the same as the version of the corresponding mesh in the map information used to generate the travel route (i.e., the latest version of the corresponding mesh in the map information in the map information DB 261) (NO in SC5), the guidance processing proceeds to SC15. Here, the description will be made with reference to FIG. 4 and, for example, on the assumption that "the map information used to generate the travel route"="the meshes M23 to M26, M19, and M20," that "the meshes M23 to M26"="the version of the map information in the map information DB 161 is older than the latest version of the map information in the map information DB 261," and that "the meshes M19 and M20"="the version of the map information in the map information DB 161 is the same as the latest version of the map information in the map information DB 261." In this case, the control unit 17 determines that the version of at least one of the meshes in the map information in the map information DB 161 differs from the version of the corresponding mesh in the map information used to generate the travel route (i.e., the latest version of the corresponding mesh in the map information in the map information DB 261).

Referring back to FIG. 5, in SC6, the control unit 17 of the vehicle-mounted device 1 requests the transmission of the differential update information. Specifically, the control unit 17 identifies (determines) the update area on a map by a method different from that used in SA4 in FIG. 2 and transmits, via the communication unit 11 to the center device 2, the differential update information transmission request that contains the identified (determined) update area, the version of the map information in the map information DB 161, and the device ID of the vehicle-mounted device 1. More specifically, the control unit 17 consults the result of the comparison made in SC5 and identifies, regarding meshes in the map information in the map information DB 161, any meshes that have the version older than the version of the respective meshes in the map information used to generate the travel road. The control unit 17 then determines the identified meshes as the update area and transmits, via the communication unit 11 to the center device 2, the differential update information transmission request that contains the determined update area, the version of the map information in the map information DB 161 (the version corresponding to each determined update area), and the device ID of the vehicle-mounted device 1. It is noted that the function of the control unit 17 of the vehicle-mounted device 1 in SC5 in FIG. 5 and the function of the control unit 17 of the vehicle-mounted device 1 to determine the update area in SC6 correspond to "update area determination means." Here, for example, in the case of FIG. 4, the control unit 17 transmits the differential update information transmission request by identifying and determining the "meshes M23 to M26" as the update area.

On the other hand, the center device 2 that receives the differential update information transmission request transmitted in SC6 in FIG. 5 executes the same procedures as the center device 2 executes when receiving the differential update information transmission request transmitted in SA4 in FIG. 2, thereby generating the differential update information corresponding to the received differential update information transmission request and transmitting the generated differential update information. Here, for example, in the case of FIG. 4, the center device 2 generates and transmits the differential update information on the "meshes M23 to M26."

Referring back to FIG. 5, in SC7, like in SA5 in FIG. 2, the differential update information is received and acquired.

Referring back to FIG. 5, in SC8, the map information updating unit 172 of the vehicle-mounted device 1 starts the update of the map information in the map information DB 161. Specifically, the map information updating unit 172 starts the update of the map information only for information corresponding to the differential update information acquired in SC7 (i.e., only the meshes determined as the update area in SC6). Here, for example, in the case of FIG. 4, the map information updating unit 172 starts the update of the map information only for the "meshes M23 to M26." This configuration prevents any meshes that have no need to be updated in the map information in the map information DB 161 (e.g., in the case of FIG. 4, the "meshes M19 and M20" that are of the latest version) from being unnecessarily updated, thus reducing the time taken to update the map information in the map information DB 161. Furthermore, the function of the control unit 17 of the vehicle-mounted device 1 as the "update area determination means" enables an area having a suitable size in units of meshes of the map information (e.g., blocks on a map) to be determined as the update area in consideration of the version of the map information, thus suitably updating the map information so as to provide flexible guidance (e.g., guidance with a new search for the travel route). In SC9 to SC15 after SC8, procedures having the same names as those of SA7 to SA13 in FIG. 2 are executed, and then the guidance processing ends.

(Parallel Processing)

In the guidance processing shown in FIG. 5, SC1 and SC2 may be repeated at intervals of a predetermined time (e.g., one to five minutes), and SC3 to SC15 may be executed in parallel with the repeatedly executed procedures of SC1 and SC2. In this case, since SC10 and SC11 out of SC3 to SC15 are the same as the repeatedly executed procedures of SC1 and SC2, the guidance processing may proceed to SC12 without executing SC10 and SC11 if the determination made in SC9 is NO. Furthermore, in this case, if the determination made in SC9 is YES, the repeatedly executed procedures of SC1 and SC2 may end because there is no longer need to provide guidance on the basis of the temporarily delivered information. This configuration enables guidance to be quickly started on the basis of the temporarily delivered information while enabling the update of the map information to be quickly started.

(Steps)

Any step in the guidance processing shown in FIG. 5 may be replaced with any step in the guidance processing shown in FIG. 2 or added to the guidance processing shown in FIG. 2. Any step in the guidance process shown in FIG. 2 may be replaced with any step in the guidance processing shown in FIG. 5 or added to the guidance processing shown in FIG. 5. Specifically, in the guidance processing shown in FIG. 2, SC1 to SC3 in FIG. 5 may be executed instead of SA1, and in the guidance processing shown in FIG. 5, SA1 in FIG. 2 may be executed instead of SC1 to SC3. Furthermore, when the vehicle-mounted device 1 and the center device 2 are configured to communicate information to each other, any selected one of the vehicle-mounted device 1 and the center device 2 may take the initiative to execute the steps in the guidance processing shown in FIG. 2 and FIG. 5 and the steps in the temporarily delivered information acquiring processing shown in FIG. 3.

(Part of Features and Effects of the Embodiment)

Finally, part of features and effects of the embodiment described above will be described below. It is noted that the features and effects of the embodiment are not limited to those described below. Part of the effects described below may be achieved by inclusion of part of the features described below, and effects other than the effects described below may be achieved by inclusion of features other than the features described below.

A guidance device according to a first aspect of the embodiment provides guidance on the basis of information acquired from a map information providing device and includes: map information storage means for storing map information used for guidance; update information acquiring means for acquiring, from the map information providing device, update information for updating the map information stored in the map information storage means; map information updating means for updating, on the basis of the update information acquired by the update information acquiring means, the map information stored in the map information storage means; temporarily delivered information acquiring means for acquiring, from the map information providing device, temporarily delivered information that is used for guidance until the map information updating means completes the update, that has an identical data structure to the map information, and that is replaceable with the map information; temporarily delivered information storage means for storing the temporarily delivered information acquired by the temporarily delivered information acquiring means; and guidance means for providing guidance, until the map information updating means completes the update, on the basis of the temporarily delivered information stored in the temporarily delivered information storage means, and for providing guidance, after the map information updating means completes the update, on the basis of the map information updated by the map information updating means.

According to the guidance device of the first aspect, guidance is provided on the basis of the temporarily delivered information until the update of the map information is completed, and guidance is provided on the basis of the updated map information after the update of the map information is completed. This, for example, allows guidance to be started quickly by using the temporarily delivered information before the update of the map information is completed, and allows flexible guidance (e.g., guidance with a new search for a travel route) that meets various needs to be provided by using the map information after the update of the map information is completed.

A guidance device according to a second aspect of the embodiment depends on the guidance device according to the first aspect and is configured such that the guidance means provides guidance on a route from a present position to a destination and such that the update information acquiring means acquires the update information on an area corresponding to the route on which the guidance means provides guidance.

According to the guidance device of the second aspect, the update information acquiring means acquires the update information on the area corresponding to the route. This, for example, prevents the map information from being updated unnecessarily on the basis of update information unrelated to the route and reduces the time taken to update the map information, thus reducing the amount of communication with the map information providing device.

A guidance device according to a third aspect of the embodiment depends on the guidance device according to the first aspect or the second aspect and is configured such that the temporarily delivered information acquiring means acquires the temporarily delivered information that is used for guidance inside an area within a predetermined distance from a present position.

According to the guidance device of the third aspect, the temporarily delivered information acquiring means acquires the temporarily delivered information that is used for guidance inside the area within the predetermined distance from the present position. This, for example, prevents the guidance device from unnecessarily communicating with the map information providing device to acquire temporarily delivered information unrelated to guidance, thus reducing the amount of communication with the map information providing device.

A guidance device according to a fourth aspect of the embodiment depends on the guidance device according to any one of the first aspect to the third aspect, includes update area determination means for determining an update area to be updated in the map information stored in the map information storage means, and is configured such that the update information acquiring means acquires, from the map information providing device, the update information corresponding to the update area determined by the update area determination means, and such that the map information updating means updates, on the basis of the update information acquired by the update information acquiring means, only information corresponding to the update area determined by the update area determination means out of the map information stored in the map information storage means.

According to the guidance device of the fourth aspect, only information corresponding to the update area determined by the update area determination means out of the map information stored in the map information storage means is updated. This, for example, prevents any areas that have no need to be updated in the map information from being unnecessarily updated, thus reducing the time taken to update the map information.

A guidance device according to a fifth aspect of the embodiment depends on the guidance device according to the fourth aspect and is configured such that the map information providing device includes map information storage means for storing provider-side map information that is map information used for guidance, and such that the update area determination means of the guidance device compares a version of the map information stored in the map information storage means of the guidance device, on a predetermined reference area basis related to the map information, with a version of the provider-side map information stored in the map information storage means of the map information providing device, and determines the update area on the basis of a result of the comparison.

According to the guidance device of the fifth aspect, the version of the map information stored in the map information storage means of the guidance device is compared, on a predetermined reference area basis related to the map information, with the version of the provider-side map information stored in the map information storage means of the map information providing device. This, for example, allows an area having a suitable size in units of reference areas (i.e., blocks on a map) in map information to be determined as an update area in consideration of the version of the map information, thus suitably updating the map information so as to provide flexible guidance (e.g., guidance with a new search for a travel route).

A guidance method according to a sixth aspect of the embodiment is a guidance method of providing guidance on the basis of information acquired from a map information providing device and includes: an update information acquiring step in which update information acquiring means acquires, from the map information providing device, update information for updating map information that is stored in map information storage means for storing the map information used for guidance; a map information updating step in which map information updating means updates, on the basis of the update information acquired in the update information acquiring step, the map information stored in the map information storage means; a temporarily delivered information acquiring step in which temporarily delivered information acquiring means acquires, from the map information providing device, temporarily delivered information that is used for guidance until the map information updating step completes the update, the temporarily delivered information having an identical data structure to the map information and replaceable with the map information; and a guidance step in which guidance means provides guidance, until the map information updating step completes the update, on the basis of the temporarily delivered information stored in temporarily delivered information storage means for storing the temporarily delivered information acquired in the temporarily delivered information acquiring step, and in which the guidance means provides guidance, after the map information updating step completes the update, on the basis of the map information updated in the map information updating step.

According to the guidance method of the sixth aspect, guidance is provided on the basis of the temporarily delivered information until the update of the map information is completed, and guidance is provided on the basis of the updated map information after the update of the map information is completed. This, for example, allows guidance to be started quickly by using the temporarily delivered information before the update of the map information is completed, and allows flexible guidance (e.g., guidance with a new search for a travel route) that meets various needs to be provided by using the map information after the update of the map information is completed.

A guidance program according to a seventh aspect of the embodiment is a guidance program for providing guidance on the basis of information acquired from a map information providing device and causes a computer to function as: update information acquiring means for acquiring, from the map information providing device, update information for updating map information that is stored in map information storage means for storing the map information used for guidance; map information updating means for updating, on the basis of the update information acquired by the update information acquiring means, the map information stored in the map information storage means; temporarily delivered information acquiring means for acquiring, from the map information providing device, temporarily delivered information that is used for guidance until the map information updating means completes the update, the temporarily delivered information having an identical data structure to the map information and replaceable with the map information; and guidance means for providing guidance, until the map information updating means completes the update, on the basis of the temporarily delivered information stored in temporarily delivered information storage means for storing the temporarily delivered information acquired by the temporarily delivered information acquiring means, and for providing guidance, after the map information updating means completes the update, on the basis of the map information updated by the map information updating means.

According to the guidance program of the seventh aspect, guidance is provided on the basis of the temporarily delivered information until the update of the map information is completed, and guidance is provided on the basis of the updated map information after the update of the map information is completed. This, for example, allows guidance to be started quickly by using the temporarily delivered information before the update of the map information is completed, and allows flexible guidance (e.g., guidance with a new search for a travel route) that meets various needs to be provided by using the map information after the update of the map information is completed.

The invention claimed is:

1. A guidance device for providing guidance on the basis of information acquired from a map information providing device, the guidance device comprising:
    storing memory configured to store map information used for guidance; and
    a processor programmed to:
        acquire, from the map information providing device, update information for updating the stored map information;
        update, on the basis of the acquired update information, the stored map information;
        acquire, from the map information providing device, temporarily delivered information that is used for guidance until the update is complete, the temporarily delivered information having an identical data structure to the stored map information and being replaceable with the stored map information;
        store the acquired temporarily delivered information;
        provide guidance, until the update is complete, on the basis of the stored temporarily delivered information; and
        provide guidance, after the update is complete, on the basis of the updated map information.

2. The guidance device according to claim 1, wherein the processor is programmed to:
    provide guidance on a route from a present position to a destination; and
    acquire the update information on an area corresponding to the route.

3. The guidance device according to claim 1, wherein the processor is programmed to:
    acquire the temporarily delivered information that is used for guidance inside an area within a predetermined distance from a present position.

4. The guidance device according claim 1, wherein the processor is programmed to:
    determine an update area to be updated in the stored map information;
    acquire, from the map information providing device, the update information corresponding to the determined update area; and
    update, on the basis of the acquired update information, only information corresponding to the determined update area out of the stored map information.

5. The guidance device according to claim 4, wherein:
    the map information providing device includes a database that stores provider-side map information that is map information used for guidance; and
    the processor is programmed to:
        compare a version of the map information stored in the memory, on a predetermined reference area basis related to the map information, with a version of the provider-side map information stored in the database; and
        determine the update area based on a result of the comparison.

6. A guidance method of providing guidance on the basis of information acquired from a map information providing device, the guidance method comprising:
    acquiring, from the map information providing device, update information for updating map information that is stored in guidance memory;
    updating, on the basis of the acquired update information, the stored map information;
    acquiring, from the map information providing device, temporarily delivered information that is used for guidance until the update is complete, the temporarily delivered information having an identical data structure to the stored map information and being replaceable with the stored map information;
    providing guidance, until the update is complete, on the basis of the acquired temporarily delivered information; and
    providing guidance, after the update is complete, on the basis of the updated map information.

7. A computer-readable storage medium storing a computer-executable guidance program for providing guidance on the basis of information acquired from a map information providing device, the guidance program causing a computer to perform the following functions:
    acquiring, from the map information providing device, update information for updating map information that is stored in guidance memory;
    updating, on the basis of the acquired update information, the stored map information;
    acquiring, from the map information providing device, temporarily delivered information that is used for guidance until the update is complete, the temporarily delivered information having an identical data structure to the stored map information and being replaceable with the stored map information;
    providing guidance, until the update is complete, on the basis of the acquired temporarily delivered information; and
    providing guidance, after the update is complete, on the basis of the updated map information.

* * * * *